US006279934B1

(12) United States Patent
Womack

(10) Patent No.: US 6,279,934 B1
(45) Date of Patent: Aug. 28, 2001

(54) ONE-HANDED DRIVE WHEELCHAIR HAVING RELATIVE SPEED CONTROL FOR REAR WHEELS

(76) Inventor: Robert C. Womack, 2010 Shea, Dallas, TX (US) 75235

( * ) Notice: Subject to any disclaimer, the term of this patent is extended or adjusted under 35 U.S.C. 154(b) by 0 days.

(21) Appl. No.: 09/662,394

(22) Filed: Sep. 14, 2000

(51) Int. Cl.[7] .................................................. B62M 1/14
(52) U.S. Cl. ................................... 280/250.1; 280/249
(58) Field of Search ............................... 280/242.1, 249, 280/250.1, 304.1

(56) References Cited

U.S. PATENT DOCUMENTS

| | | | |
|---|---|---|---|
| 5,112,072 | 5/1992 | Korosue | 280/240 |
| 5,306,035 | 4/1994 | Counts | 280/250.1 |
| 5,941,547 | 4/1999 | Drake | 280/243 |
| 5,944,131 | 8/1999 | Schaffner et al. | 180/65.1 |
| 5,988,661 | 11/1999 | Garfinkle | 280/250.1 |
| 6,007,082 | 12/1999 | Watwood et al. | 280/244 |
| 6,047,980 | 4/2000 | Margherita et al. | 280/250.1 |

*Primary Examiner*—Brian L. Johnson
*Assistant Examiner*—Matthew Luby
(74) *Attorney, Agent, or Firm*—Howison, Chauza, Thoma, Handley & Arnott, LLP

(57) ABSTRACT

A drive shaft (78) extends across a wheelchair (12), transverse to a centerline (122) of the wheelchair (12). A first wheel (56) is rotatably mounted to one end of the drive shaft (78) and a second wheel (58) is fixedly mounted to the other end of the drive shaft (78), for rotating with the drive shaft (78). A drive wheel (66) is fixedly mounted to the drive shaft (78) on an opposite end of the drive shaft (78) from the second wheel (58) and adjacent to the first wheel (56). The drive wheel (66) is of a slightly smaller diameter than that of the first and second wheels (56, 58), being three to fifteen percent smaller. The drive shaft (78) has a plurality of linkage sections (92–100) which are rotatably connected such that the drive shaft (78) may be collapsed with a wheelchair frame (14). A coupling sleeve (84) is slidably mounted on the drive shaft (78) for sliding across a portion of the adjacent sections (92–100) of the drive shaft (78) to rigidly fix the sections (92–100) of the drive shaft (78) in coaxial alignment. A dual brake (46) may be selectively applied to frictionally lock one of or both of the first and second wheels (56, 58) from rotating. The first and second wheels (56, 58) and the drive shaft (78) are mounted to a drive assembly (64) which is secured to the frame (14) of the wheelchair (12) by fast pins (114, 116). In a second embodiment (232), an electronically controlled differential speed control unit (236) couples a rear wheel (56) of one side of a wheelchair (236) to a rear wheel (58) of the opposite side of the wheelchair (236) to electronically control the relative speed of the two rear wheels (56, 58) in response to commands of the user.

20 Claims, 8 Drawing Sheets

ONE-HANDED DRIVE WHEELCHAIR HAVING RELATIVE SPEED CONTROL FOR REAR WHEELS

BACKGROUND OF THE INVENTION

Prior art manually-driven wheelchairs have been provided for two-handed operation. Typically, a chair is moveably supported by two large rear wheels and two smaller forward wheels. These chairs are manually driven by a user of the chair gripping top portions of the two large rear wheels and then pushing the top portions of the wheels in a desired direction of travel to propel the wheelchair in the desired direction. If a user desires to turn the wheelchair in a gradual change in direction, the wheel on the side of the desired direction of turn is turned more slowly than the wheel of the opposite side of the wheelchair. Sharp turns may be accomplished by only rotating one of the rear wheels while the other rear wheel is held stationary, and in some cases rotating the two rear wheels in opposite directions.

Some manually-driven wheelchairs have also been provided for single-handed operation. Such wheelchairs have provided drive axles and drive wheels which are non-rotatably connected to one of the two large rear wheels. The drive wheel is aligned an on opposite side of the wheelchair from the rear wheel to which it is non-rotatably connected by the drive axle. Some of the drive axles are not collapsible, such that they require removal for the wheelchair to collapse for storage, such as in an automobile. Such prior art wheelchairs also required tooling in order to convert the wheelchair from left-handed drive to right-handed drive operation. Others of such prior art wheel chairs did not have rigid members for rigidly connecting folding portions of the drive axles. Another disadvantage of prior art wheelchairs of this type is that the right and left side wheels cannot track in a straight line because both the right and left side wheels cannot be driven simultaneously with one hand with one stroke of a user's single arm.

SUMMARY OF THE INVENTION

A wheelchair is provided having a frame and a plurality of wheels which are rotatably mounted to the frame in supporting arrangement therewith. A drive shaft is rotatably mounted to the frame, extending transverse to the centerline of the wheelchair. A first one of the wheels is rotatably mounted to one end of the drive shaft. A second one of the wheels is fixedly mounted to the other end of the drive shaft, for rotating with the drive shaft. A remote drive wheel is fixedly mounted to the drive shaft on an opposite end of the drive shaft from the second wheel and adjacent to the first wheel. The remote drive wheel is of a slightly smaller diameter than that of the first and second wheels, preferably being about one-eight of an inch smaller in diameter. The drive shaft has a plurality of adjacent sections which are rotatably connected such that the drive shaft may be collapsed with the wheelchair frame. A coupling sleeve is slidably mounted on the drive shaft for sliding across a plurality of the adjacent sections of the drive shaft to rigidly fix the adjacent sections of the drive shaft in coaxial alignment. A dual brake control is mounted to the frame and will lock on both of the first and second wheels. The first and second wheels and the drive shaft are mounted to a drive assembly having two posts which upwardly extend for being received within tubular members of the wheelchair frame, and are latched within the tubular members by fast pins. In a second embodiment, an electronically controlled differential speed drive control unit couples a rear wheel of one side of a wheelchair to a rear wheel of the opposite side of the wheelchair, such that the relative speed of the two rear wheels are electronically controlled, preferably in response to voice, breath, suction, body or head position, or tactile commands of the user, such as those controls which are currently being used in some motor driven chairs. One such control is a head position control, which favors a turn to right if the user's head is positioned toward the left side of the wheel chair, favors to the left if the user's head is positioned to the right side of the wheelchair, and goes straight ahead if the user's head is positioned to the center of the wheelchair.

BRIEF DESCRIPTION OF THE DRAWINGS

For a more complete understanding of the present invention and the advantages thereof, reference is now made to the following description taken in conjunction with the accompanying Drawings, in which like parts are described with like numbers, and in which.

DETAILED DESCRIPTION OF THE INVENTION

Figure 1:
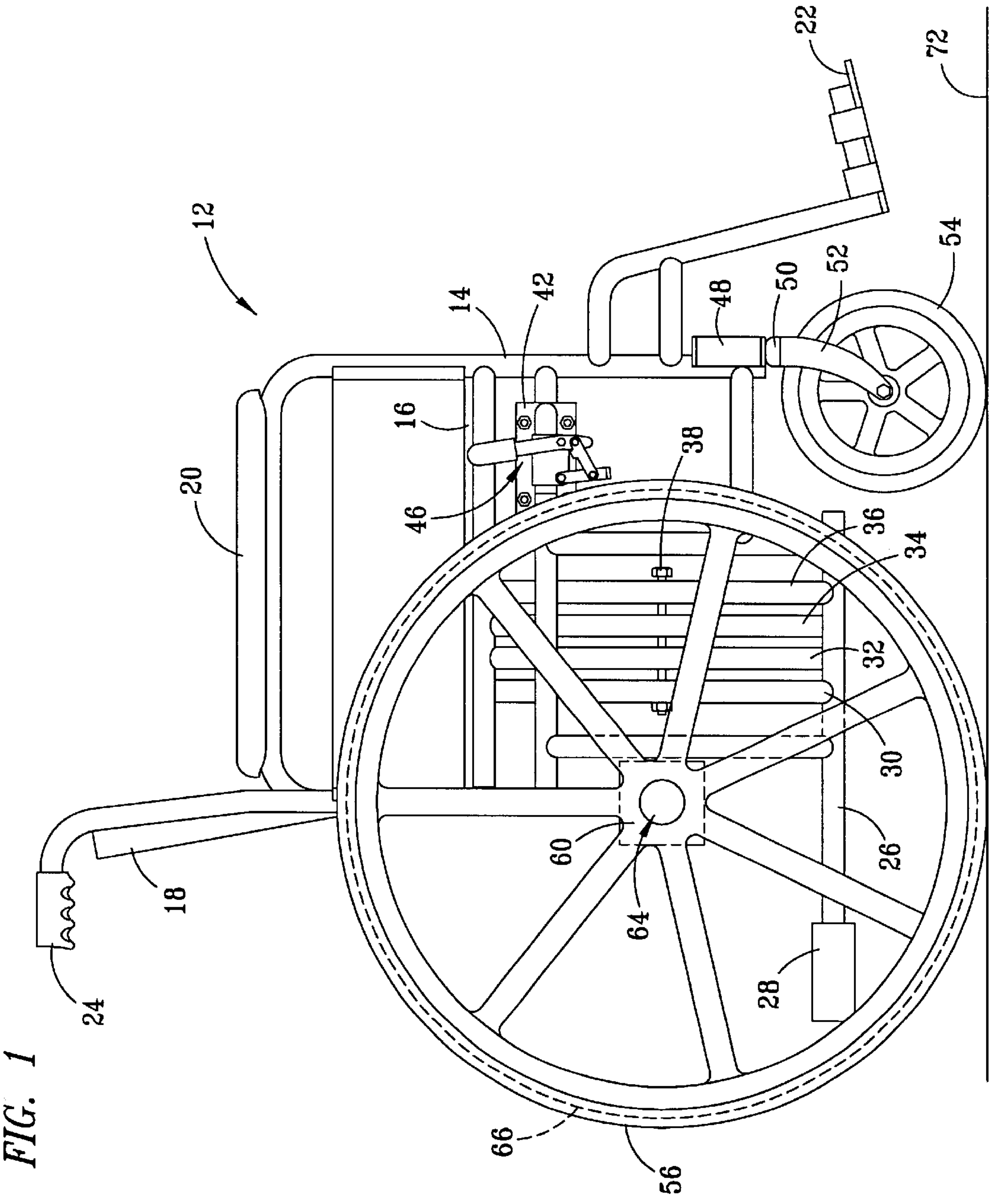
FIG. 1 is a side elevation view of a wheelchair made according to the present invention.

FIG. 1 is a side elevation view of a one-handed drive wheelchair 12 having a collapsible frame 14. The wheelchair 12 has a seat 16, a backrest 18, two armrests 20, two hand-push handles 24, a foot plate arm 26 and a foot plate 28 which are mounted to the frame 14 of the wheelchair 12. The foot plate 28 is provided for stepping down upon to raise the forward end of the wheelchair 12, such as for lifting the forward end of the wheelchair 12 over a curb or such other obstruction. The collapsible frame 14 includes support arms 30, 32, 34 and 36 which are pivotally connected together by a pivot pin 38, such that the frame 14 may be collapsed. The pivot pin 38 extends centrally through the support arms 30–36, in a direction which is transverse to the longitudinal length of the arms 30–36. Mounting plates 42 and 44 (shown in FIG. 2) are mounted to the intermediate portion of the forward ends of opposite sides of the frame 14 of the wheelchair 12, respectively. A dual manual brake assembly 46 is shown mounted to the mounting plate 42, and is removable for mounting on the opposite side of the frame 14 to the mounting plate 44 (shown in FIG. 2). Two cylinders 48 are mounted to the lower portion of the forward end of the frame 14 for receiving respective ones of the support posts 50 which extend upward from the forward wheel frames 52 to mount the forward wheels 54 to the frame 14. The wheelchair 12 further includes rear wheels 56 and 58 (shown in FIG. 2), which are mounted on opposite sides of the frame 14 for supporting the wheelchair 12 on a ground surface 72. Wheels 58 and 66 are pinned to a shaft assembly 64. The wheel 56 is free to idle on a drive shaft 64.

Figure 2:
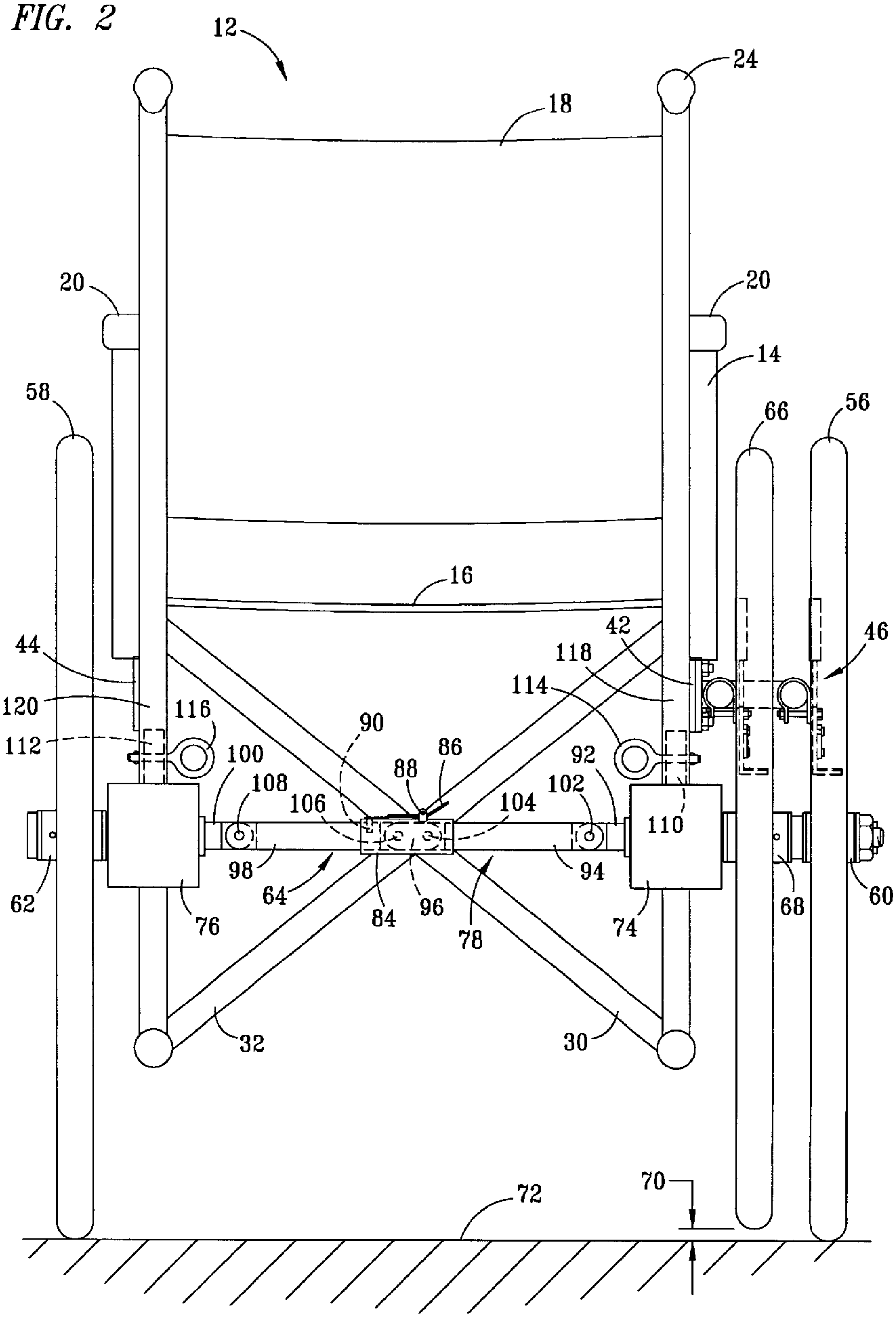
FIG. 2 is a rear elevation view of the wheelchair.

FIG. 2 is a rear elevation view of the wheelchair 12. The rear wheels 56 and 58 have respective hubs 60 and 62 which are mounted on opposite sides of the drive assembly 64. Also mounted to one side of the drive assembly shaft 64 is a remote drive wheel 66, preferably being mounted adjacent to the rear wheel 56. The remote drive wheel 66 has hub 68 which is mounted to the drive assembly 64. The remote drive wheel 66 is spaced apart at least seven-eights (7/8) of an inch from the rear wheel 56, preferably one inch, as measured between adjacent edges of the wheels 56 and 66, to prevent trapping of fingers and thumbs of a user therebetween. It should be noted that the rear wheels 56 and 58 are preferably of the same diameter and are mounted to the wheelchair 12 for supporting the wheelchair above the ground surface 72. The remote drive wheel 66 is of a slightly smaller diameter than the diameter of the rear wheels 56 and 58, preferably ranging from one-eight (1/8) inches to three-sixteenth (3/16) inches in diameter smaller than respective diameters of the rear wheels 56 and 58. In the preferred embodiment, the diameter of the remote drive wheel 66 is approximately 1/8 inch in diameter smaller than the diameter of the rear wheels 56 and 58. In some embodiments, the remote drive wheel 66 need only be of a slightly smaller diameter than the rear wheels 56 and 58, such that the remote drive wheel 66 only barely clears the floor. This range of relative diametrical sizes between the remote drive wheel 66 and the rear wheels 56, 58 allows a user to grip both the wheel 56 and the wheel 66 simultaneously with one hand, while manually powering the wheelchair 12 with a single push. A twist of the operator's wrist can favor either the wheel 56 or the wheel 66 to cause wheelchair to go slightly left or slightly right. More defined, or sharper, turns may be accomplished with one of the hand brakes of the dual brake assembly 46 locked on.

The drive assembly 64 includes a bearing housing 74 and a bearing housing 76 which rotatably mount a collapsible drive shaft 78 to the frame 14 of the wheelchair 12. Mounted to the collapsible drive shaft 78 is a shaft coupling sleeve 84 which provides a collar that is slidable upon the collapsible drive shaft 78 to a latch position to maintain the collapsible drive shaft in a lineally straight alignment, or moveable to a released position to allow the collapsible drive shaft 78 to collapse with the collapsible frame 14 of the wheelchair 12. The collapsible drive shaft 78 includes linkages 92, 94, 96, 98 and 100, which are mounted to adjacent ones thereof by respective pivot pins 102, 104, 106 and 108. In the latched position, the coupling sleeve extends across three sections of the drive shaft 78, the linkages 94, 96 and 98, preventing rotation at two pivot pins 104, 106, which prevents relative rotation between the linkages 92 and 94 about the pivot pin 102, and rotation between the linkages 98 and 100 about the pivot pin 108. The shaft coupling sleeve 84 includes a lever 86 which is pivotally mounted by pivot pin 88 to the shaft coupling sleeve 84. A detent 90 is mounted to the lever 86 for engaging the collapsible drive shaft 78 to retain the coupling sleeve 84 in a fixed position relative to the collapsible drive shaft 78, with the coupling sleeve 84 disposed in the latched position to maintain the drive shaft 78 in a straight, lineal alignment, wherein the linkages 92, 94, 96, 98 and 100 are disposed in a rigid, coaxial alignment. The coupling sleeve 84 and the linkages 92, 94, 98 and 100 are preferably cylindrical in shape. The linkage 96 may be provided by a single plate, or two spaced apart plates connected in parallel.

Two posts 110 and 112 extend upward from the bearing housings 74 and 76, respectively. Preferably, the posts 110 and 112 are of a cylindrical shape and have bores 109 and 111 (shown in FIGS. 4 and 6) for receiving fast pins 114 and 116, respectively. The fast pins 114 and 116 are preferably attached to the bearing houses 74 and 76 by lanyards (not shown) to prevent their loss. The rearward, lower ends of the frame 14 have downwardly extending tubular members 118 and 120 which are of a sized and a shape for slidably receiving respective ones of either of the posts 110 and 112. The tubes 118 and 120 have holes which may be aligned with the bores 109 and 111 (shown in FIGS. 4 and 6) through the posts 110 and 112 for receiving the fast pins 114 and 116.

Figure 3:
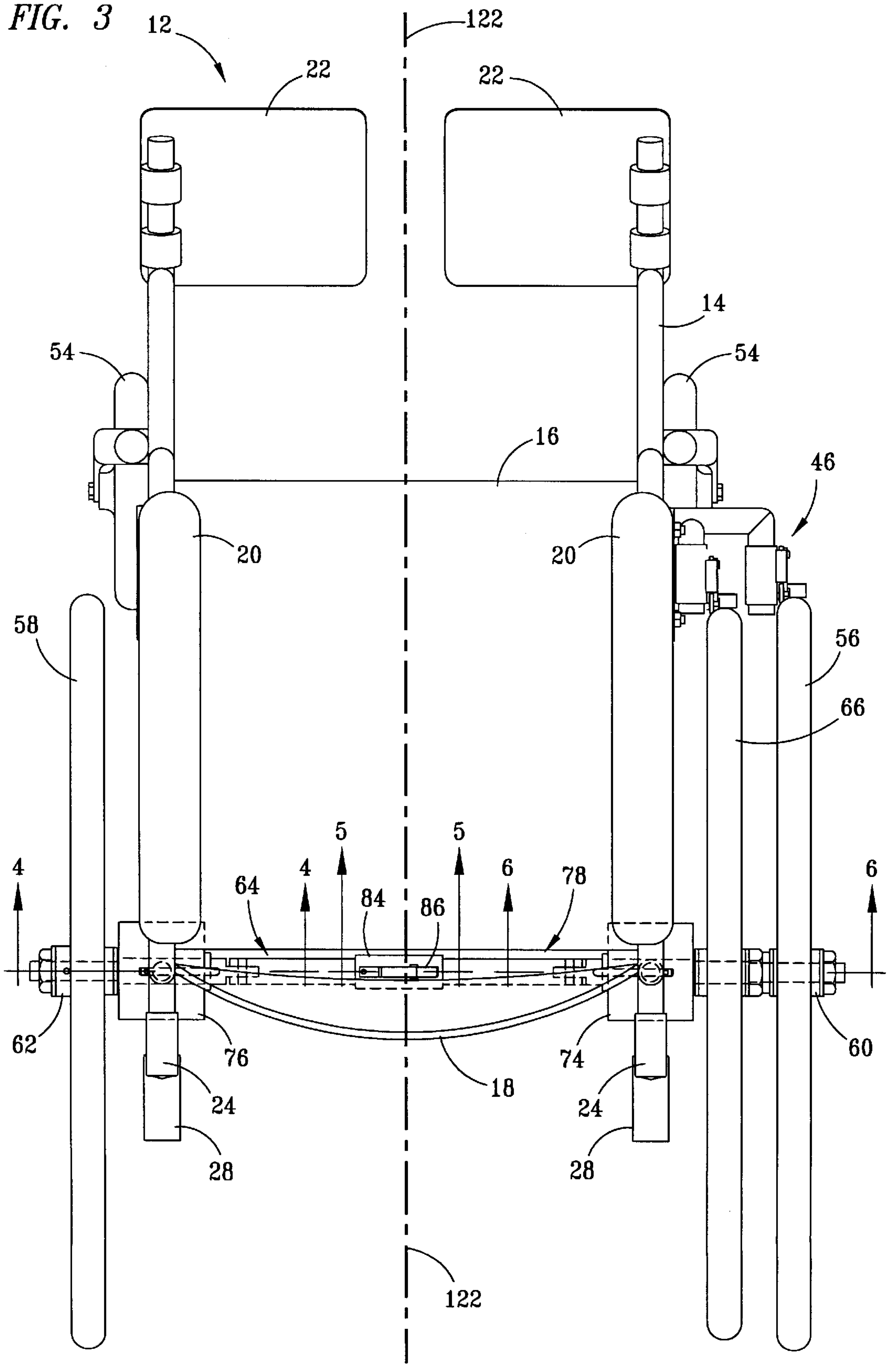
FIG. 3 is a top view of the wheelchair.

FIG. 3 is a top view of the wheelchair 12, showing various portions of the wheelchair 12 and the drive assembly 64. The collapsible drive shaft 78 is shown in a lineally straight alignment with the shaft coupling sleeve 84 fixedly engaged thereto in the latched position. Also shown is the dual brake assembly 46 having two components which extend adjacent to the rear wheel 56 and the remote drive wheel 66. A centerline 122 of the wheelchair 12 is herein defined to run centrally through the seat 16 and between the two armrests 20, extending in forward and rearward directions relative to the wheelchair 12.

Figure 4:
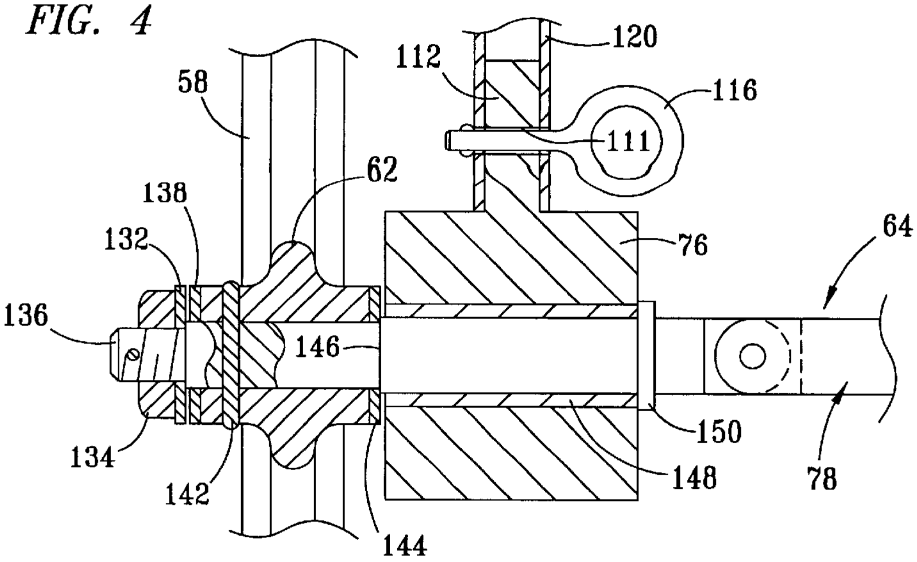
FIG. 4 is a sectional view of the wheelchair, taken along section line 4—4 of FIG. 3.

FIG. 4 is a sectional view of the wheelchair 23, taken along section line 4—4 of FIG. 3. The drive shaft assembly 64 is shown including a thrust bearing 132, a nut 134 and a threaded post 136 which is formed on the end of the drive shaft 78. The nut 134 threadingly secures to the threaded post 136 to secure the thrust bearing 132 to the end of the drive shaft 78. A bearing surface 138 is provided on the end of the hub 62, preferably by a hard facing. A coupling pin 142 extends through a bore in the hub 62 and the drive shaft 78 to fixedly secure the hub 62, such that the hub 62 and the wheel 58 are non-rotatably secured to the drive shaft 78. A bearing surface 144 is provided on the inward end of the hub 62 and engages an annular-shaped shoulder 146 of the drive shaft 78. A bearing sleeve 148 is nonrotatably mounted within the bearing housing 76 and rotatably couples the bearing housing 76 to the drive shaft 78. A stop bearing 150 is fixedly mounted to the drive shaft 78.

Figure 5:
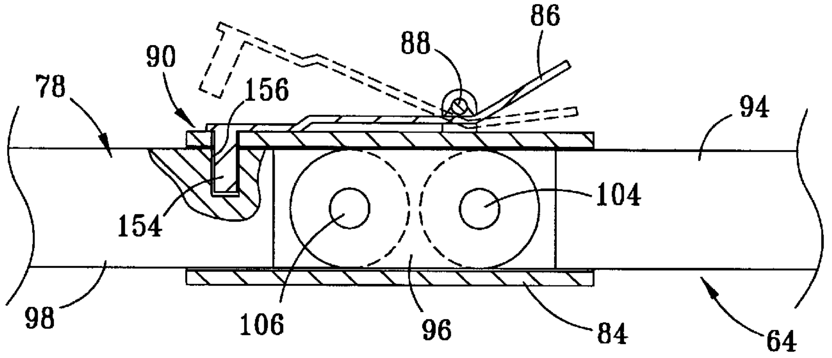
FIG. 5 is a sectional view of a drive shaft of a wheelchair, taken along section line 5—5 of FIG. 3.

FIG. 5 is a sectional view of a central portion of the drive shaft 78, taken along section line 5—5 of FIG. 3. The detent is provided by a detent pin 154 which extends downward from the lever 86 and into a bore 156 which is formed into the drive shaft 78. The detent pin 154 fits within the bore 156 to latch the shaft coupling sleeve 84 in a latched position with respect to the drive shaft 78, which latches the linkages 94, 96 and 98 of the drive shaft 78 in coaxial alignment, such that the linkages 94, 96 and 98 are lineally straight, that is, aligned along a straight line.

Figure 6:
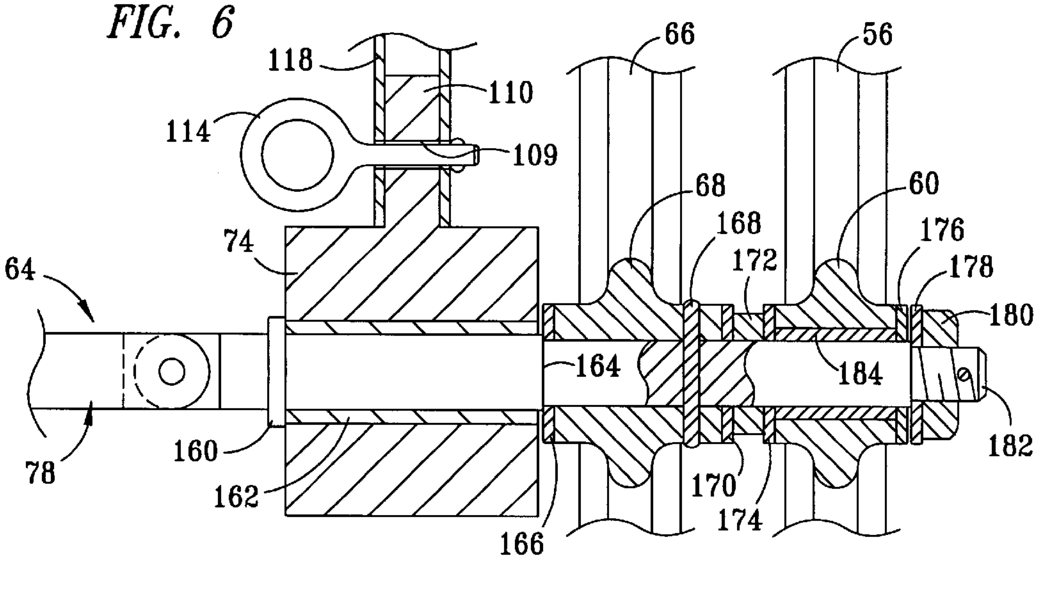
FIG. 6 is a sectional view of the wheelchair, taken along section line 6—6 of FIG. 3.

FIG. 6 is a sectional view of the wheelchair 12, taken along section line 6—6 of FIG. 3. A bearing stop 160 is mounted to the drive shaft 78. A bearing sleeve 162 is fixedly secured within the bearing housing 74 to rotatably couple the bearing housing 74 to the drive shaft 78. A face bearing 166 is mounted to an inward end of the hub 68 and engages an annular-shaped shoulder 164 of the drive shaft 78. A coupling pin 168 extends through a bore in the hub 68 to fixedly secure the hub 68 and the remote drive wheel 66 to the drive shaft 78, such that the hub 68 and the drive wheel 66 will not rotate relative to the drive shaft 78. A bearing surface 170 is provided on the face of the end of the hub 68 and engages a spacer 172. A bearing surface 174 is provided on the inward end of the hub 60 and engages the outward end of the spacer 172. The outward end of the hub 60 has a bearing surface 176 which engages a bearing plate 178. The bearing plate 178 is threadingly secured to a threaded end 182 of the drive shaft 78 by a nut 180. Hub 60 has a bushing inside to rotatably secure the hub 60 and the wheel 56 to the drive shaft 78, such that the hub 60 and the wheel 56 rotate freely on the drive shaft 78.

Figure 7:
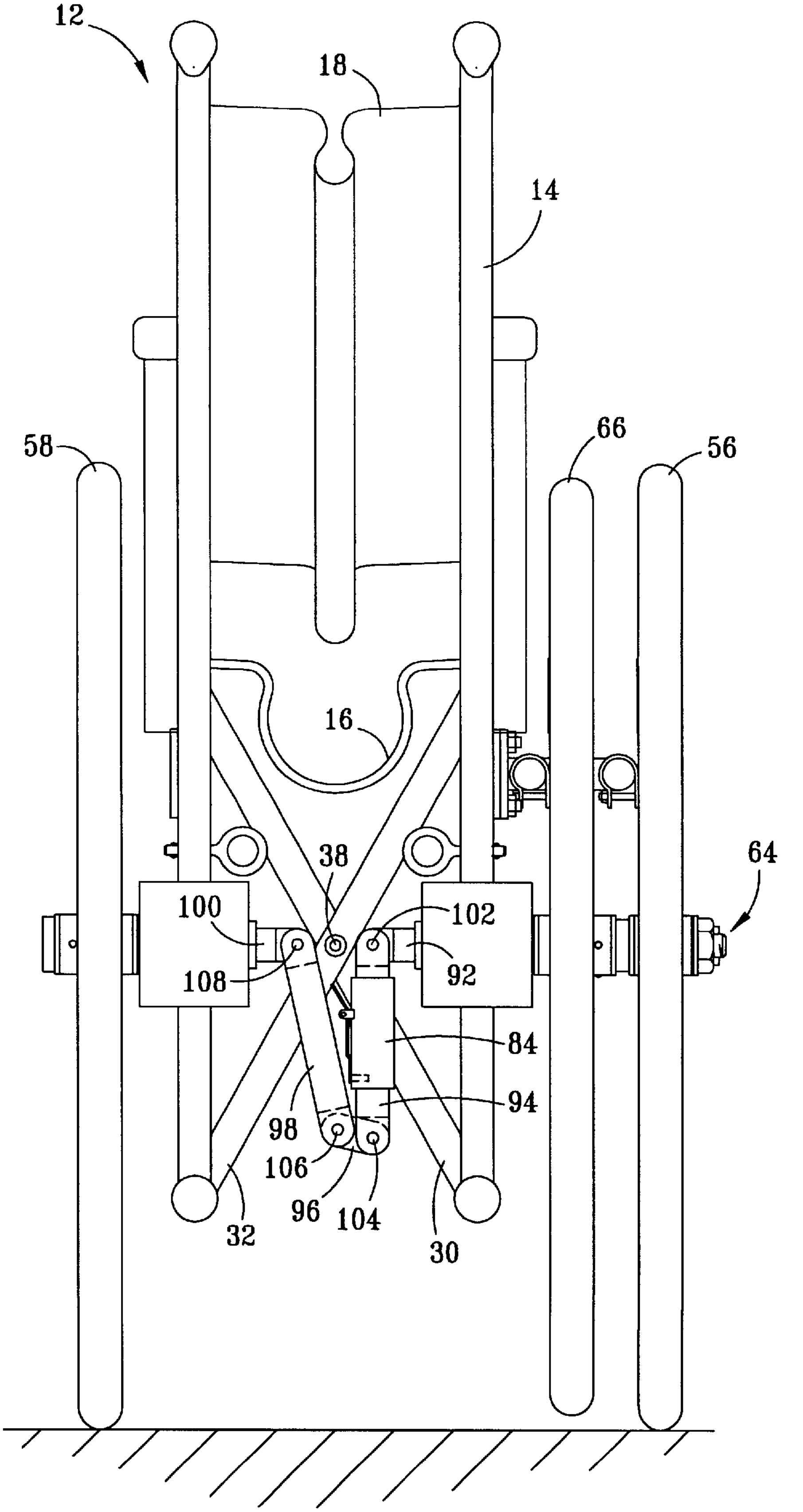
FIG. 7 is a rear elevation view of the wheelchair, shown in a collapsed or folded position.

FIG. 7 is a rear elevation view of the wheelchair 12, showing the wheelchair 12 in a collapsed or folded position. The coupling 84 has been moved away from the linkage 96, from the latched position (shown in FIG. 2) to the released position, such that the linkage 98 may rotate about the pivot pin 106 and the linkage 94 may rotate about the pivot pin 104. Both of the linkages 94 and 96 rotate relative to the linkage 96. This allows the linkage 98 to rotate relative to the coupling pin 108 and relative to the linkage 100, and the linkage 94 to rotate relative to the linkage pin 102 and the linkage 92. It should be noted, that in various embodiments the coupling pins 102, 104, 106 and 108 may be either free of, or fixed to one of the respective ones of the linkages 92–100. Additionally, the linkages 30 and 32, and the linkages 34 and 36 (shown in FIG. 1) may rotate relative to the pin 38 such that the sides of the wheelchair 12 are moved towards one another.

Figure 8:
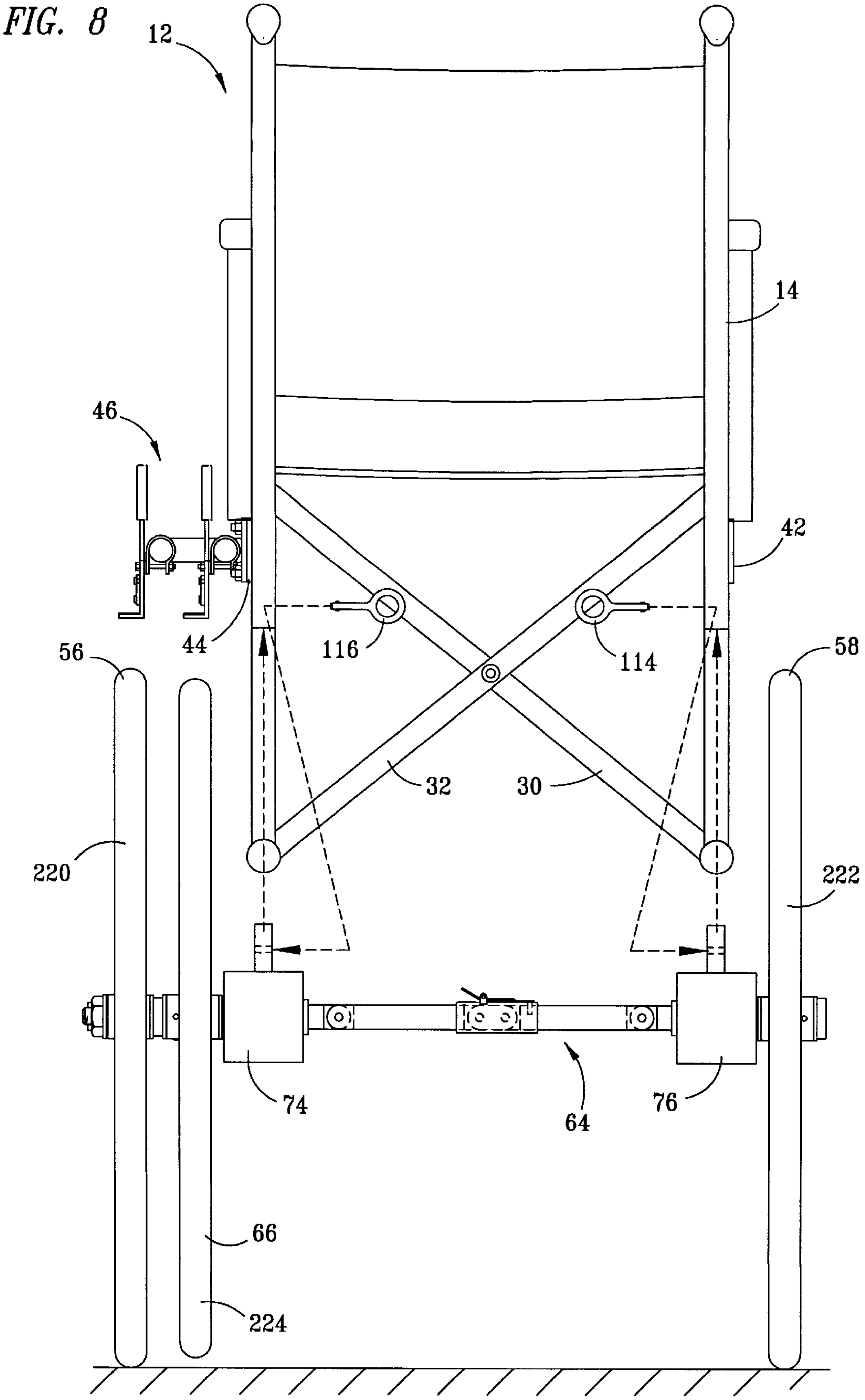
FIG. 8 is a rear elevation view of the wheelchair, showing the wheelchair frame detached from the drive shaft assembly.

FIG. 8 is a rear elevation view of the wheelchair 12, showing the collapsible frame 14 being released from above the drive shaft assembly 64. The drive assembly 64 may be rotated from the right-handed position shown in FIGS. 1–7, into the left-hand position relative to the frame 14, as shown, to place the wheel 56 and remote drive wheel 66 on an opposite side of the wheelchair from that shown in FIGS. 1–7, such that a wheelchair may be driven by a left-handed person. In some embodiments, the dual brake assembly 46 may be secured to the various ones of the mounting plates 42, 44 by fast pins (not shown) to provide for tool-less conversion of the wheelchair 12 between the right-handed and the left-handed configurations.

Figure 9:
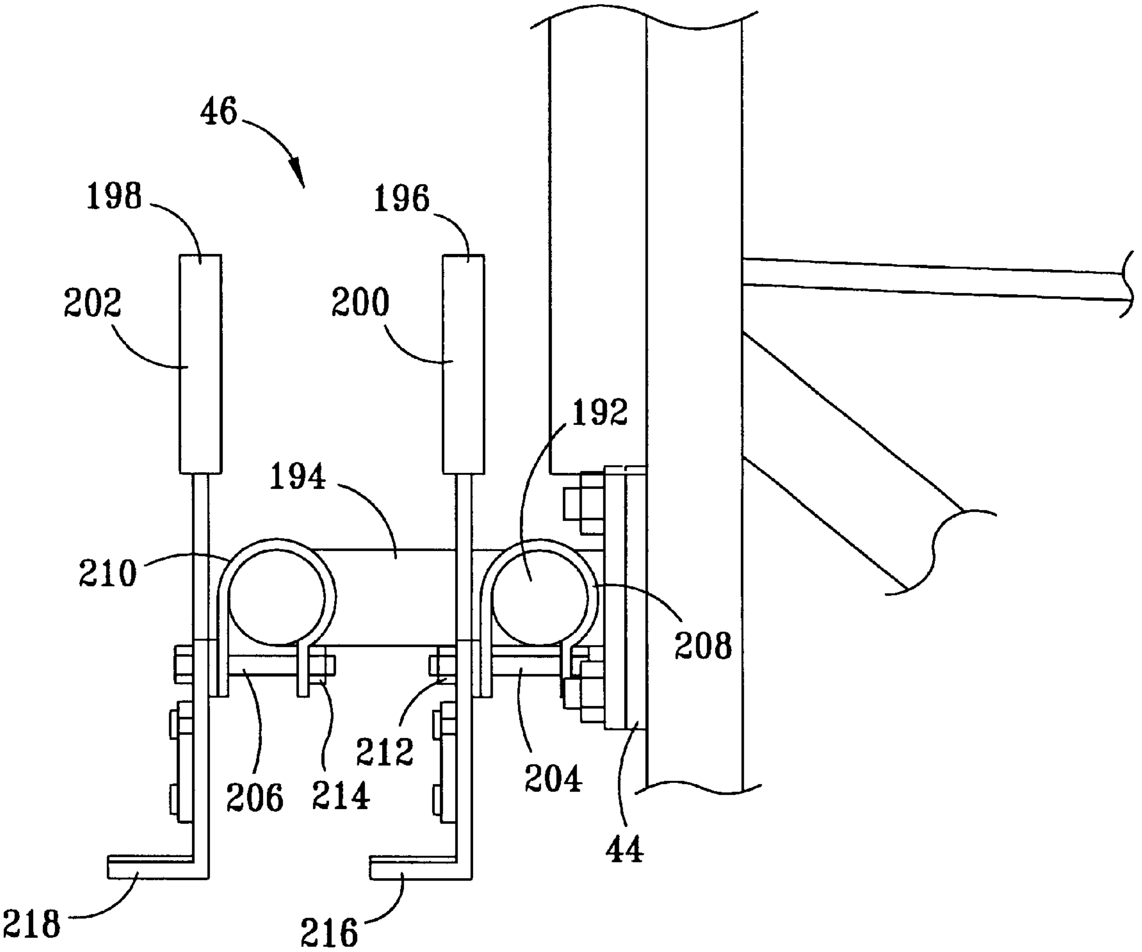
FIG. 9 is a partial, rear elevation view of the wheelchair, showing a detail view of a dual brake assembly which provides individual wheel locking.

FIG. 9 is a rear elevation view of the wheelchair 12, showing details of the dual brake assembly 46, which preferably provides locking brakes between the rear wheels 56, 58. The dual brake assembly 46 includes a support arm 192 and a support ann 194. Two lever arms 196 and 198 are mounted to respective ones of the support arms 192 and 194. Hand grips 200 and 202 are provided for pushing on the levers 196 and 198, respectively, to rotate the levers 196 and 198 about the pivot pins 204 and 206, respectively. The pivot pins 204 and 206 are mounted to respective ones of the support arms 192 and 194 by clamps 208 and 210, respectively. Nuts 212 and 214 are threadingly secured to respective ones of the pivot pins 204 and 206 to secure the clamps 208 and 210 to respective ones of the support arms 192, 194. Brake arms 216 and 218 extend from beneath the respective ones of the levers 196 and 198, and extend transverse to the longitudinal lengths of the lever arms 196 and 198 for engaging the outer rubber of the tires 220 and 224 of respective ones of the rear wheel 56 and the remote drive wheel 66 (shown in FIG. 8). A rubber tire 222 is also mounted around the exterior of the rear wheel 58 (shown in FIG. 8).

In operation, the brake levers 196 and 198 are rotated about the pivot pins 204 and 206, such that the brake arms 216 and 218 are selectively engaged with the tires 220 and 222, respectively, to preferably lock one, or both, of the wheels 56 and 66 to prevent rotation. This allows a user to simultaneously grip one of the wheels 56 and 66 with one hand, and push with a single push, while one of the wheels 56 and 66 remains locked to provide for sharp turns. The angular velocity of the drive wheel 66 is transmitted to the rear wheel 58 on the opposite side of the wheelchair 12 by the drive shaft 78. If the angular velocities of the two wheels 56 and 58 are the same, since they are of the same diameter, the wheelchair 12 will track in a straight line. If the two angular velocities of the wheels 56 and 58 are different, the wheelchair will turn in the direction of the one of the wheels 56, 58 having the slower angular velocity, since the wheels 56, 58 are preferably of the same diameter.

A user may apply two alternative methods for providing relative angular speed control between the drive wheel 66 and the rear wheel 56, and thus between the rear wheels 56, 58, by means of a user of the wheelchair adjusting his grip on the wheels 66 and 56 as he is gripping both wheels 66, 56 and pushing the upper portions of the wheels 66, 56 forward. A first method is for a user to lift one side of his palm from the rear wheel 56 while pushing both wheels 66 and 56, such that he will push the drive wheel 66 for a slightly longer stroke, thus imparting slightly more energy, and thus slightly more angular velocity to the drive wheel 66 than to the wheel 56. A second method is to slightly rotate the palm during the pushing motion, such that the drive wheel 66 is pushed at a slightly higher speed than that rear wheel 56. The palms may be rotated by twisting in the wrist, the arm or both, in a clockwise direction as viewed from above for a right-handed user, or in a counter-clockwise direction as viewed from above for a left-handed user. In either method, the closer the diameter of the remote drive wheel 66 to that of the diameter of the wheels 56, 58, the less manipulation required for the wheelchair 12 to track in a straight lineal direction. Thus, the diameter of the wheel 66 is preferably only slightly smaller than that of the wheels 56, 58, just so that it will not contact the ground surface 72 in various conditions encountered by the user. Additionally, the wheelchair 12 may be made to turn in various directions my varying the time of contact of various portions of the palm of a user's hand with the drive wheel 66 and the rear wheel 56.

Figure 10:
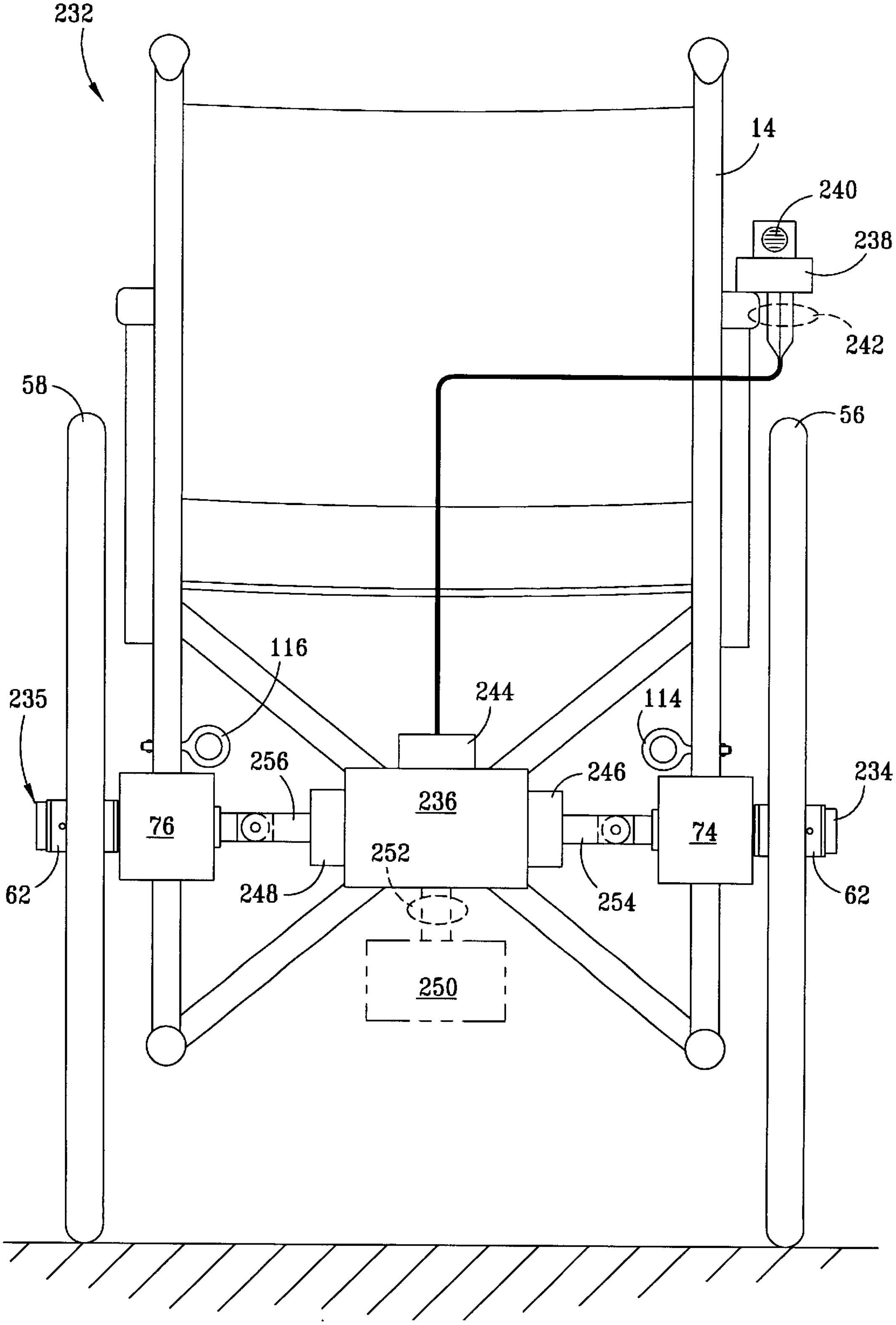
FIG. 10 is a rear elevation view of an alternative embodiment of the wheelchair, having an electronically controlled differential speed control unit.

FIG. 10 is a rear elevation view of an alternative one-handed drive wheelchair 232 having a remote control power balancing unit, provided by a differential speed control unit 238. The alternative wheelchair 232 has a frame 14 mounted to a drive assembly 235 in accordance with that set forth above for wheelchair 12, being secured by the fast pins 114 and 116 to bearing housing 74 and 76. The drive assembly 235 includes a differential speed control unit 236, which is connected to a remote control unit 238. Preferably, the remote control unit 238 is provided by microphone pickup 240, sensitive to command control signals emitted by the user, such as voice commands, breath commands, or other audible commands, proximity commands or pressure commands from the head or body, suction, and the like. In some embodiments, the control unit 238 may be sensitive to tactile commands, such as touching movements, slight weight shifts, or the like. Control lines 242 extend from the remote control unit 238 to the differential control unit 244. The remote control unit 238 may be mounted to the user, or to various components of the wheelchair 12. Output drive shaft connectors 246 and 248 connect to the drive shafts 254 and 256. A power unit 250 is provided, such as a battery. The power input 252 allows for mechanical advantage when one wheel, such as wheel 56, is being manually rotated such that the angular speed of the opposite wheel, wheel 58, may be increased or decreased relative to the angular speed of the wheel 56 by the differential speed control unit 236 according to the control commands of the user detected by the remote control unit 238. The differential speed control unit 236 may be provided by various means. One such means is to provide planetary gears which are selectively engaged by electric clutches.

The electronically controlled wheelchair 232 may be driven by either of the hand wheels 56 and 58, while steering is done by the speed control unit 236 in response to any kind of command from the user. Thus, the speed control unit 236 may be powered by a small battery, which is of a size smaller than batteries of conventional wheelchairs which are battery powered, since forward motion of the wheelchair 232 is hand propelled and not battery powered. Only the speed control unit 236 of the wheelchair 232 is battery powered; the wheelchair 232 is hand propelled.

It should also be noted, that in other embodiments, the larger wheels of the wheelchair may be in forward positions and the smaller wheels may be in rearward positions, relative to the wheelchair.

The present invention provides several advantages over prior single-handed wheelchairs. A manually driven, one-handed drive wheelchair is provided which is lightweight, not requiring the power source, such as a large battery, of prior art motorized wheelchairs, yet having relative speed control means for controlling the relative speed between the rear wheels, during one-handed operation of the wheelchair for a person to drive both wheels which a single stroke. In one aspect, a dual brake assembly is provided to selectively lock either or both wheels. In another aspect, a remote control differential speed unit is provided which controlled by the user, such as by audible signals, body or head pressure, body or head position, suction, or the like, to operate a powered differential control unit such that the output of a manually driven shaft may be output to the opposite side of the wheelchair in either slower or faster speeds. In yet another aspect, relative speed control may be attained by the method by which a user pushes the wheelchair, by varying the duration of contact the user applies which his hands to the remote drive wheel and to the rear wheel disposed adjacent to the remote drive wheel. Additionally, the wheelchair is collapsible and includes a collapsible drive shaft having various sections which are rigidly secured into coaxial alignment by a coupling sleeve which is fixedly positioned across a plurality of the various sections, preferably three as shown in the preferred embodiment. The wheelchair can be driven by either hand. The differential will steer either way according to commands received from a sensor.

Although the preferred embodiment has been described in detail, it should be understood that various changes, substitutions and alterations can be made therein without departing from the spirit and scope of the invention as defined by the appended claims.

What is claimed is:

1. In a one-handed drive wheelchair having a plurality of wheels, a drive shaft mounted to said wheelchair to extend transverse to a centerline of said wheelchair, one of the plurality of wheels defining a first wheel, said first wheel being rotatably mounted to one end of said drive shaft, another of said plurality of wheels defining a second wheel, said second wheel being fixedly mounted to the other end of said drive shaft, for rotating with said drive shaft, a drive wheel fixedly mounted to said drive shaft, on an opposite end of said drive shaft from said second wheel and adjacent to said first wheel, said drive wheel being of a smaller diameter than that of said first and second wheels, the improvement comprising:

a relative speed control included in said wheelchair, said relative speed control being selectively operable to apply a selective relative rotation between said first wheel and said second wheel, as said drive wheel is being manually driven.

2. The wheelchair according to claim 1, wherein said relative speed control comprises a dual brake for locking one or both of said first and second wheels.

3. The wheelchair according to claim 1, wherein said relative speed control comprises an electronically controlled differential control unit coupled between said first and second wheels, and operable to electronically control the relative speed of the first and second wheels in response to commands of the user.

4. The wheelchair according to claim 1, wherein said relative speed control comprises said diameter of said drive wheel being one-eight of an inch to three-sixteenths of an inch smaller than the diameter of said first and second wheels.

5. The wheelchair according to claim 4, wherein said relative speed control comprises said diameter of said drive wheel being one-eight of an inch smaller in diameter than respective diameters of said first and second wheels.

6. The wheelchair according to claim 1, wherein said drive shaft comprises a plurality of adjacent sections which are rotatably connected such that said drive shaft may be collapsed, and a coupling sleeve which is slidably mounted on said drive shaft for sliding across a portion of said adjacent sections to rigidly fix said adjacent sections in coaxial alignment, such that said drive shaft is lineally straight.

7. The wheelchair according to claim 1, wherein said first and second wheels and said drive shaft are mounted to a drive assembly which is secured to a frame of said wheelchair by fast pins.

8. A one-handed drive wheelchair having a plurality of wheels, said wheelchair comprising:

a drive shaft mounted to said wheelchair, extending transverse to a centerline of said wheelchair;

one of said plurality of wheels defining a first wheel, said first wheel being rotatably mounted to one end of said drive shaft;

another of said plurality of wheels defining a second wheel, said second wheel being fixedly mounted to the other end of said drive shaft, for rotating with said drive shaft;

a drive wheel fixedly mounted to said drive shaft, on an opposite end of said drive shaft from said second wheel and adjacent to said first wheel, said drive wheel being of a smaller diameter than that of said first and second wheels; and a relative speed control included in said wheelchair, said relative speed control being selectively operated to apply a selective relative rotation between said first wheel and second wheel.

9. The wheelchair according to claim 8, wherein said relative speed control comprises a dual brake having selectively applied frictional elements.

10. The wheelchair according to claim 8, wherein said relative speed control comprises an electronically controlled differential control unit coupled between said first and second wheels, and operable to electronically control the relative speed of the first and second wheels in response to commands of the user.

11. The wheelchair according to claim 8, wherein said relative speed control comprises said diameter of said drive wheel being one-eight of an inch to three-sixteenths of an inch smaller than the diameter of said first and second wheels.

12. The wheelchair according to claim 11, wherein said relative speed control comprises said diameter of said drive wheel is one-eight of an inch smaller in diameter than the respective diameters of said first and second wheels.

13. The wheelchair according to claim 8, wherein said drive shaft comprises a plurality of adjacent sections which are rotatably connected such that said drive shaft may be collapsed, and a coupling sleeve which is slidably mounted on said drive shaft for sliding across a portion of said adjacent sections to rigidly fix said adjacent sections in coaxial alignment, such that said drive shaft is lineally straight.

14. The wheelchair according to claim 8, wherein:

said relative speed control comprises a dual brake having selectively applied frictional elements;

wherein said relative speed control comprises said diameter of said drive wheel being one-eight of an inch to three-sixteenths of an inch smaller in diameter than respective diameters of said first and second wheels; and said drive shaft comprises a plurality of adjacent sections which are rotatably connected such that said drive shaft may be collapsed, and a coupling sleeve which is slidably mounted on said drive shaft for sliding across a portion of said adjacent sections to rigidly fix said adjacent sections in coaxial alignment, such that said drive shaft is lineally straight.

15. The wheelchair according to claim 14, wherein said first and second wheels and said drive shaft are mounted to a drive assembly which is secured to a frame of said wheelchair by fast pins, and said relative speed control comprises said diameter of said drive wheel is one-eight of an inch smaller in diameter than the respective diameters of said first and second wheels.

16. A method for manually operating a one-handed drive wheelchair having a plurality of wheels, a drive shaft mounted to said wheelchair, extending transverse to a centerline of the wheelchair, one of the plurality of wheels defining a first wheel, the first wheel being rotatably mounted to one end of the drive shaft, another of the plurality of wheels defining a second wheel, the second wheel being fixedly mounted to the other end of the drive shaft, for rotating with the drive shaft, a drive wheel fixedly mounted to the drive shaft, on an opposite end of the drive shaft from the second wheel and adjacent to the first wheel, the drive wheel being of a smaller diameter than that of the first and second wheels, the method comprising the steps of:

providing the wheelchair with a relative speed control which is selectively operated to apply a selective relative rotation between the first wheel and the second wheel;

determining a desired direction of travel; and operating the relative speed control to apply a desired relative rotational speed between the first wheel and the second wheel; and manually pushing the wheelchair in the desired direction of travel.

17. The method according to claim 16, wherein the relative speed control comprises a dual brake having selectively applied frictional elements, and the method further comprises the steps of selectively operating said dual brakes such that one of said frictional elements is selectively applied to stop rotation of one of said first and second wheels.

18. The method according to claim 16, wherein the relative speed control comprises an electronically controlled differential unit which couples a rear wheel of one side of the wheelchair to a rear wheel of the opposite side of the wheelchair to electronically control the relative speed of the two rear wheels in response to commands of a user.

19. The method according to claim 16, wherein the relative speed control comprises the steps of:

providing the diameter of said drive wheel as being one-eight of an inch to three-sixteenths of an inch smaller in diameter than respective diameters of the first and second wheels;

simultaneously applying a pushing stoke to the first wheel and the drive wheel with a single hand of the user; and releasing the single hand of the user from engaging the first wheel for a portion of the pushing stroke as the single hand of the user continues to engage the drive wheel.

20. The method according to claim 16, wherein the relative speed control comprises the steps of:

providing the diameter of said drive wheel as being one-eight of an inch to three-sixteenths of an inch smaller in diameter than respective diameters of the first and second wheels;

simultaneously applying a pushing stoke to the first wheel and the drive wheel with a single hand of the user; and twisting the single hand while simultaneously applying the pushing stroke to the first wheel and the drive wheel with the single hand, to impart a selective relative angular velocity to the first wheel and the drive wheel.

* * * * *